(12) United States Patent  
Ye et al.

(10) Patent No.: US 12,627,794 B2  
(45) Date of Patent: May 12, 2026

(54) CONTENT AWARE DATASET GENERATION AND MODEL SELECTION FOR LEARNED IMAGE COMPRESSION

(71) Applicant: Alibaba (China) Co., Ltd., Hangzhou (CN)

(72) Inventors: Yan Ye, San Diego, CA (US); Wei Jiang, Sunnyvale, CA (US); Wei Wang, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 143 days.

(21) Appl. No.: 18/217,947

(22) Filed: Jul. 3, 2023

(65) Prior Publication Data

US 2024/0022718 A1 Jan. 18, 2024

Related U.S. Application Data

(60) Provisional application No. 63/389,780, filed on Jul. 15, 2022.

(51) Int. Cl.
| | |
|---|---|
| *H04N 19/115* | (2014.01) |
| *H04N 19/105* | (2014.01) |
| *H04N 19/176* | (2014.01) |
| *H04N 19/46* | (2014.01) |

(52) U.S. Cl.
CPC ......... *H04N 19/115* (2014.11); *H04N 19/105* (2014.11); *H04N 19/176* (2014.11); *H04N 19/46* (2014.11)

(58) Field of Classification Search
CPC .. H04N 19/105; H04N 19/115; H04N 19/119; H04N 19/136; H04N 19/14; H04N 19/176; H04N 19/46

USPC .................................................... 375/240.02  
See application file for complete search history.

(56) References Cited

U.S. PATENT DOCUMENTS

| | | | | |
|---|---|---|---|---|
| 11,580,673 | B1 * | 2/2023 | Ren ...................... | G06N 3/0464 |
| 2004/0013196 | A1 * | 1/2004 | Takagi .................. | H04N 19/61 |
| | | | | 375/E7.176 |
| 2006/0188025 | A1 * | 8/2006 | Hannuksela ......... | H04N 19/895 |
| | | | | 375/E7.181 |
| 2021/0225039 | A1 * | 7/2021 | Bhunia .................. | G06F 18/23 |
| 2022/0239908 | A1 * | 7/2022 | Meng ..................... | H04N 19/86 |
| 2022/0292727 | A1 * | 9/2022 | Pei .......................... | G06T 9/002 |
| 2022/0329876 | A1 * | 10/2022 | Djelouah .............. | G06N 3/045 |

FOREIGN PATENT DOCUMENTS

| | | | | | |
|---|---|---|---|---|---|
| CN | 111641832 | A | * | 9/2020 | .......... H04N 19/124 |
| CN | 114863220 | A | * | 8/2022 | ............. G06N 3/045 |
| TW | 201249211 | A | * | 12/2012 | ............... H04N 7/28 |
| WO | WO-2021211966 | A1 | * | 10/2021 | ............. G06N 3/045 |
| WO | WO-2022257049 | A1 | * | 12/2022 | ............... G06N 3/02 |
| WO | WO-2023287018 | A1 | * | 1/2023 | ............. H04N 19/52 |
| WO | WO-2023092404 | A1 | * | 6/2023 | .......... H04N 19/117 |

* cited by examiner

*Primary Examiner* — Behrooz M Senfi  
(74) *Attorney, Agent, or Firm* — Lee & Hayes, P.C.

(57) ABSTRACT

A system may receive an input image block, and input the input image block into multiple models which may be trained using a plurality of different datasets of image blocks. Each model of the multiple models may be trained using a dataset having similar attributes. The system may determine a model having a highest compression efficiency from among the multiple models, and encode the input image block using the determined model.

14 Claims, 4 Drawing Sheets

CONTENT AWARE DATASET GENERATION AND MODEL SELECTION FOR LEARNED IMAGE COMPRESSION

CROSS REFERENCE TO RELATED PATENT APPLICATION

This application claims the benefit of U.S. Provisional Patent Application No. 63/389,780, entitled "Content Aware Dataset Generation and Model Selection for Learned Image Compression" and filed Jul. 15, 2022, which is expressly incorporated herein by reference in its entirety.

BACKGROUND

Image/video compression plays a critical role in image/video transmission and storage systems. Over the past few decades, various image/video coding standards, such as JPEG, JPEG2000, H.264/MPEG-4 Part 10 AVC standard and H.265/HEVC standard, etc., for image/video compression have been developed. In recent years, a new Versatile Video Coding (VVC) standard has been developed and finalized in 2020 to further improve the video coding efficiency. In all these standards, a hybrid coding framework which includes intra/inter prediction, transform, quantization and entropy coding, is used to exploit spatial/temporal redundancy, visual redundancy, and statistic redundancy in image/video.

In recent years, deep image/video compression methods exhibit a fast developing trend with promising results. Compared with traditional image/video compression methods which mainly rely on hand-crafted modules that need to be designed individually, the deep image/video compression methods can optimize all the modules in an image/video compression framework in an end-to-end manner. In addition, as compared with the traditional image/video compression methods, the deep image/video compression methods can easily perform optimization using different distortion metrics.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
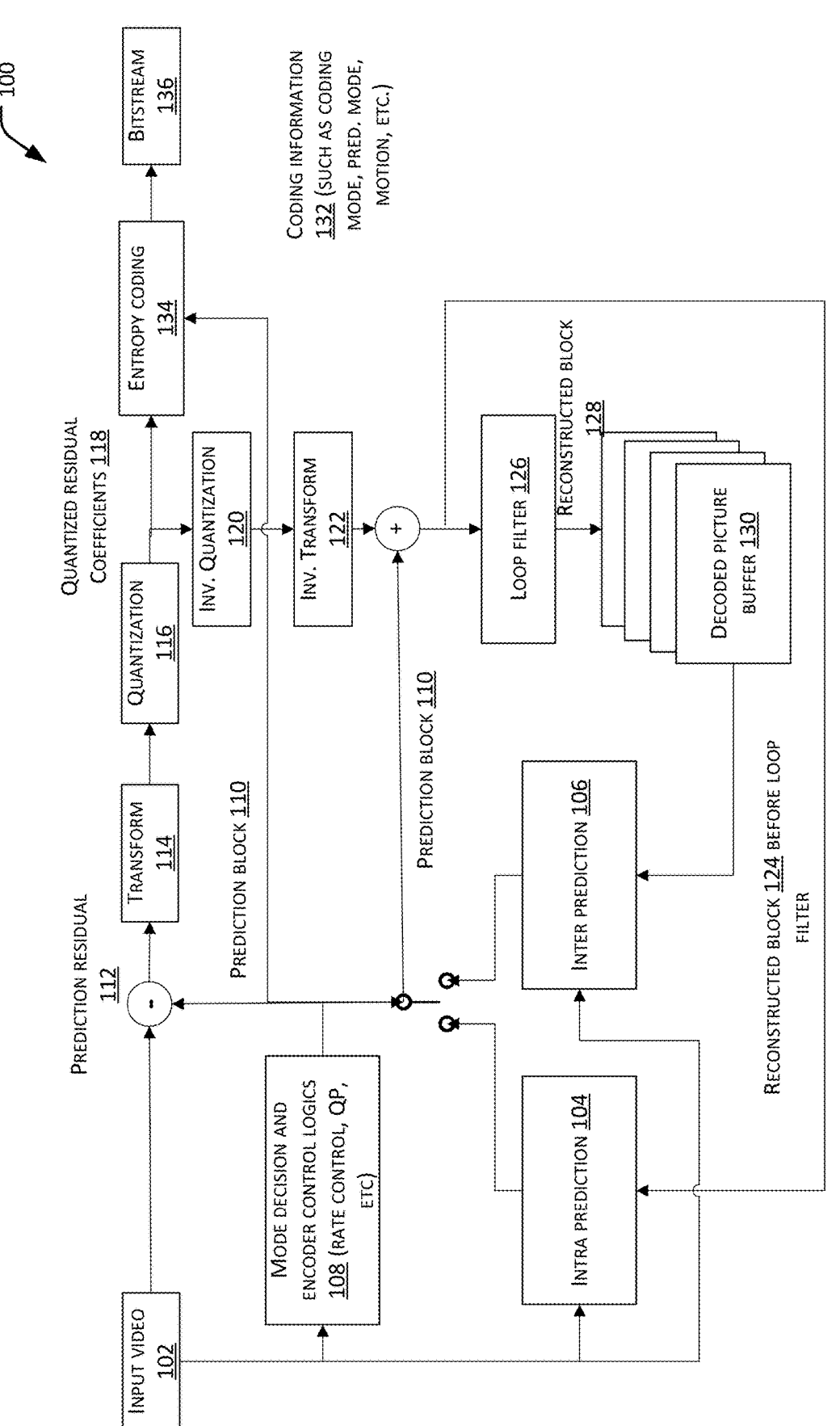
FIG. 1 illustrates an encoder block diagram of an example block-based hybrid video coding system.

In example implementations, the VVC may be constructed based on the same hybrid video coding system that has been used in modern video compression standards such as HEVC, H.264/AVC, MPEG2, H.263, etc. FIG. 1 shows an encoder block diagram of an example hybrid video coding system 100. In example implementations, an input video 102 may be processed block by block. In example implementations, the hybrid video coding system 100 may divide a picture or image of the input video 102 into macroblocks ("MBs"), each having predefined dimensions (such as N×N pixels, where N is a positive integer), and divide or partition each macroblock into a plurality of partitions.

By way of example and not limitation, the hybrid video coding system 100 may divide a picture or image of the input video 102 into coding tree units (CTUs). In example implementations, a coded tree unit (CTU) in VVC may be defined as the largest block unit, and may be as large as 128×128 luma samples (plus corresponding chroma samples depending on a chroma format that is used). In example implementations, a CTU may be further partitioned into coding units (CUs) using a quad-tree, binary tree, or ternary tree. In example implementations, at the leaf nodes of such partitioning structure, coding information such as a coding mode (e.g., intra mode or inter mode, etc.), motion information (such as a reference index, motion vectors, etc.) if inter coded, and quantized residual coefficients may be sent.

In alternative implementations, the hybrid video coding system 100 may divide a picture into units of N×N pixels, which may then be further subdivided into subunits. Each of these largest subdivided units of a picture may generally be referred to as a "block" for the purpose of the present disclosure. In example implementations, a CU is coded using one block of luma samples and two corresponding blocks of chroma samples, where pictures are not monochrome and are coded using one coding tree.

In example implementations, if intra prediction 104 (which is also called as spatial prediction) is used, spatial neighboring samples may be used to predict a current block to be coded. In example implementations, if inter prediction 106 (which is also called as temporal prediction or motion compensated prediction) is used, samples from already coded pictures (i.e., reference pictures) may be used to predict the current block. In example implementations, different prediction methods may be used for inter prediction, which include, but are not limited to uni-prediction, bi-prediction, etc. In example implementations, if uni-prediction is used, only one motion vector pointing to one reference picture is used to generate a predictor for the current block. In example implementations, if bi-prediction is used, two motion vectors, with each pointing to its corresponding reference picture, are used to generate the predictor for the current block. In example implementations, motion vectors and reference indices may be sent to a decoder to identify where predictor(s) of the current block come(s) from.

In example implementations, after intra or inter prediction is performed, modes may be decided 108 and an encoder may choose the best prediction mode for the current block, for example, based on a rate-distortion optimization method or other mode selection methods. In example implementations, after the best prediction mode is selected, a prediction block 110 may be generated based on the best prediction mode, and subtracted from the input video block.

In example implementations, a prediction residual 112, i.e., a difference between the input video block and the prediction block, may be sent to a transform module 114 and a quantization module 116 to generate quantized residual coefficients 118. In example implementations, based on the prediction residual, the transform module 114 may perform a transform operation on the residual by a matrix arithmetic operation to derive an array of coefficients (which can be referred to as "residual coefficients," "transform coefficients," and the like), thereby encoding the current block as a transform block ("TB"). In example implementations, the transform coefficients may refer to coefficients representing one of several spatial transformations, such as a diagonal flip, a vertical flip, or a rotation, which may be applied to a sub-block. In example implementations, the quantization module 116 may perform a quantization operation on the residual coefficients by a matrix arithmetic operation, based on a quantization matrix and assigned quantization parameters (QP). Residual coefficients falling within an interval are kept, and residual coefficients falling outside the interval step are discarded.

In example implementations, the quantized residual coefficients may then be inverse quantized 120 and inverse transformed 122 to obtain a reconstructed residual. For example, an inverse quantization operation and an inverse transform operation may be performed on the quantized residual coefficients, by matrix arithmetic operations which are the inverse of the quantization operation and transform operation as described above. The inverse quantization operation and the inverse transform operation yield a reconstructed residual. For example, the prediction block and the reconstructed residual may be added together to form a reconstructed block 124 before loop filtering, which may be used to provide reference samples for intra prediction.

In example implementations, loop filtering 126, such as deblocking, sample adaptive offset (SAO), and adaptive loop filter (ALF), etc., may be applied to the reconstructed block to form a new reconstructed block 128 after loop filtering, which may then be stored in a decoded picture buffer 130, and used to provide reference samples for inter prediction.

In example implementations, coding information 132, such as a coding mode (e.g., intra or inter prediction, etc.), an intra prediction mode, motion information, quantized residual coefficients, etc., may be sent to an entropy coding module 134 to further reduce the bit rate before being packed into an output video bitstream.

Figure 2:
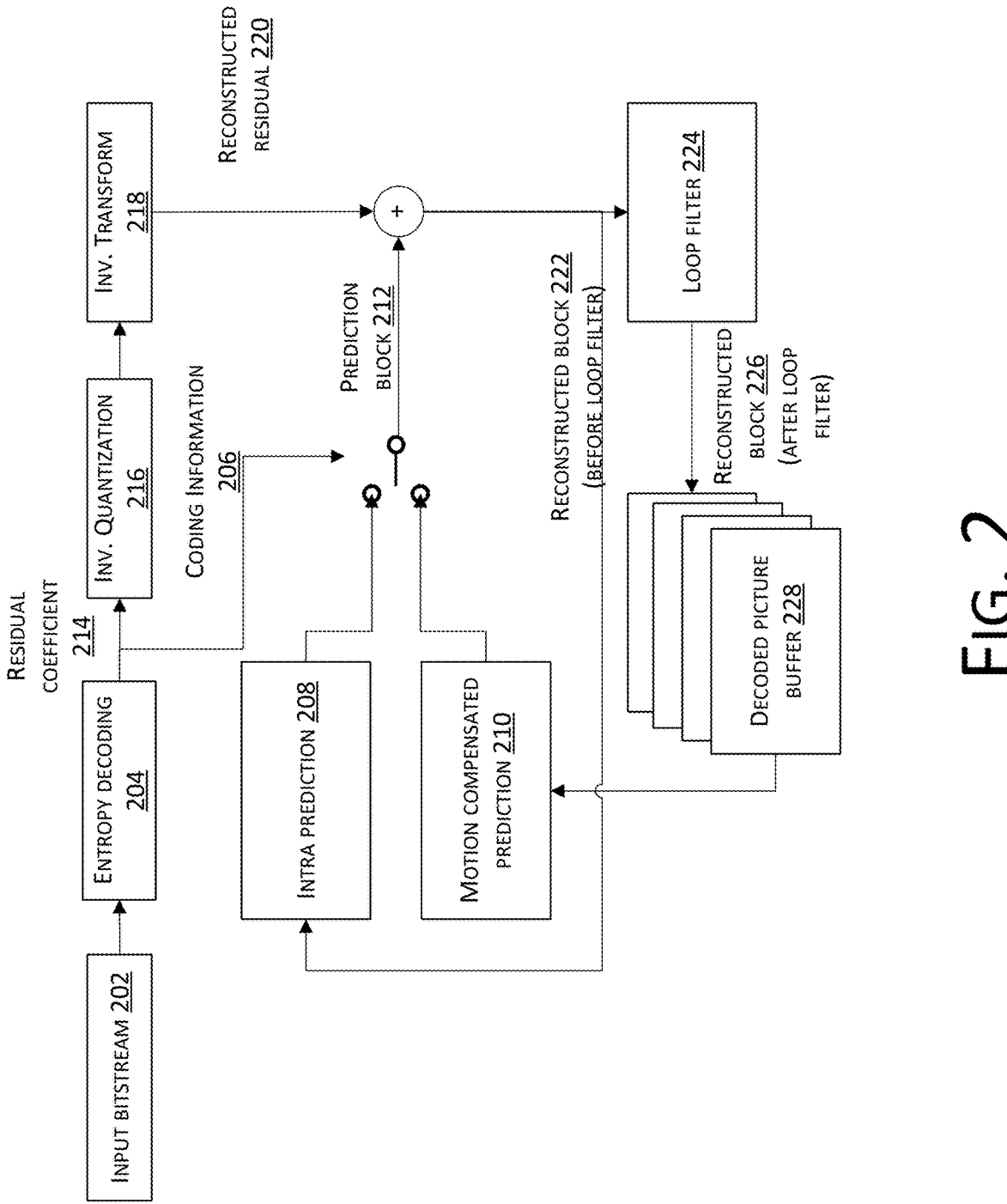
FIG. 2 illustrates a decoder block diagram of an example block-based hybrid video coding system.

FIG. 2 shows a decoder block diagram of an example hybrid video coding system 200. In example implementations, a video bitstream or input video 202 may be unpacked and entropy decoded by an entropy decoder module 204. For example, the entropy decoding module 204 may perform entropy decoding and output quantized residual coefficients, wherein, according to CABAC, bins are decoded by reversing the mappings of symbols to bins, thereby recovering the entropy-coded quantized residual coefficients. In example implementations, coding information 206 (such as a coding mode, prediction information, motion information if motion prediction has been used for encoding, etc.) may be obtained after unpacking and decoding by the entropy decoding module 204. In example implementations, the coding mode may be used to select whether a spatial prediction module 108 (or called intra prediction module) or a temporal prediction module 210 (or called motion compensated prediction module) is to be invoked or called. In example implementations, prediction information obtained after unpacking and decoding may then be sent to an appropriate prediction module (i.e., the spatial prediction module 208 or the temporal prediction module 210, for example) to generate a predictor or prediction block 212. In example implementations, quantized residual coefficients 214 obtained after unpacking and decoding may be sent to an inverse quantization module 216 and an inverse transform module 218 to obtain a reconstructed residual 220. By way of example and not limitation, the inverse quantization module 216 and the inverse transform module 218 may perform an inverse quantization operation and an inverse transform operation on the decoded quantized residual coefficients respectively and successively, by matrix arithmetic operations which are the inverse of the quantization operation and transform operation as described above.

In example implementations, the inverse quantization operation and the inverse transform operation may yield a reconstructed residual. For example, the predictor 212 and the reconstructed residual 220 may be added together to form a reconstructed block 222 before loop filtering.

In example implementations, a loop filter 224, such as deblocking, SAO and/or ALF, etc., may be applied to form a new reconstructed block 226 after loop filtering, which may then be stored in a decoded picture buffer (DPB) for prediction of future or subsequent pictures. Reconstructed pictures stored in the DPB may also be sent to a display, such as a TV, a PC, a smartphone or a tablet for presentation to an end-user.

In example implementations, learned image compression (LIC) may additionally or alternatively be used. In example implementations, the learned image compression may be performed based on an auto-encoder structure. In example implementations, an encoder may transform an original image into latents, and perform quantization on the latents. After quantization, the encoder may compress the quantized latents into a bitstream using an entropy coder. In example implementations, upon receiving the bitstream at a decoder, the decoder may first entropy decode the quantized latents from the bitstream, and perform inverse transformation on the quantized latents to obtain a reconstructed image.

In example implementations, network structures may be designed to make latents more compact and obtain higher quality reconstructed images from the latents. By way of examples and not limitation, a recurrent neural network may be used to compress residuals (such as prediction residuals, etc.) progressively, and binary representations may be employed at each iteration to achieve scalable coding. In example implementations, generative adversarial networks may also be used to compress images at extremely low bit rates (e.g., lower than a predetermined bit rate) while pursuing the subjective quality, though the objective quality is hard to be guaranteed. In example implementations, an adaptive context model for entropy coding may also be used to further improve the coding performance. Examples of the adaptive context model may include, but are not limited to, a joint autoregressive and hierarchical priors model for learned image compression, etc.

Figure 3:
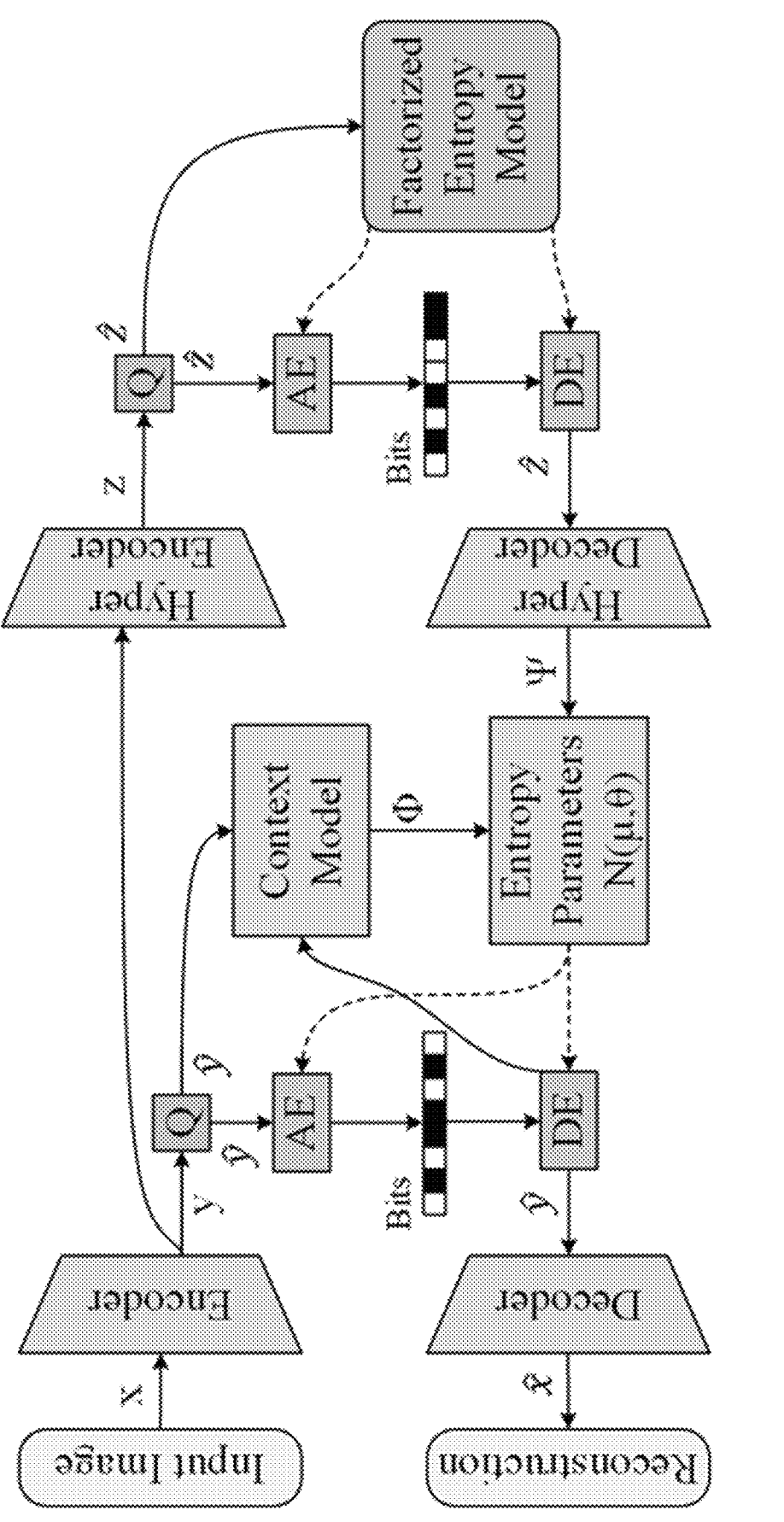
FIG. 3 illustrates a schematic block diagram of an example joint autoregressive and hierarchical priors model for Learned Image Compression.

FIG. 3 shows a block diagram of an example joint autoregressive and hierarchical priors model for learned image compression. In this example, the joint autoregressive and hierarchical priors model is described to include two sub-networks. In example implementations, the two sub-networks may include a core auto-encoder and a hyper auto-encoder. In example implementations, the core auto-encoder may be configured to learn a quantized latent representation ($\bar{y}$) of images (x) (encoder and decoder blocks). In example implementations, the hyper auto-encoder may be configured to learn a quantized hyper latent representation ($\bar{z}$) from core transform results (y) (hyper encoder and hyper decoder blocks). In example implementations, when encoding a quantized latent representation $\hat{y}$, $\hat{y}$ may be modeled as a predetermined distribution, such as Gaussian convolved with a unit uniform distribution, for example. By way of examples and not limitation, if $\hat{y}$ is modeled as the Gaussian convolved with a unit uniform distribution, mean and scale parameters thereof may be estimated using an entropy parameter network (i.e., entropy parameters $N(\mu,\theta)$), which combines a context model (context model blocks) and hyper inverse transformed results, where $\mu$ represents a mean and $\theta$ represents a variance or standard deviation of a Gaussian signal. When encoding a quantized hyper latent representation $\hat{z}$, a density model, such as a non-parametric, fully factorized density model, for example, may be used to represent corresponding distribution.

In example implementations, when training the whole network, one of the training goals may be to minimize an expected length of a bitstream as well as an expected distortion of a reconstructed image with respect to an original image, which gives rise to a rate-distortion optimization problem as follows:

$$R + \lambda \cdot D = E_{x \sim p_x}\left[-\log_2 p_{\hat{y}}(\hat{y})\right] + E_{x \sim p_x}\left[-\log_2 p_{\hat{z}}(\hat{z})\right] + \lambda \cdot E_{x \sim p_x}\|x - \hat{x}\|_2^2$$

where the first term (i.e., $E_{x \sim p_x}[-\log_2 p_{\hat{y}}(\hat{y})]$) represents an expected rate of quantized latents, the second term (i.e., $E_{x \sim p_x}[-\log_2 p_{\hat{z}}(\hat{z})]$) represents an expected rate of quantized hyper latents, and the third term $$\left(\text{i.e., } \lambda \cdot E_{x \sim p_x}\|x - \hat{x}\|_2^2\right)$$

represents an expected distortion of a reconstructed image with respect to an original image.

In example implementations, for the context model, a 2D mask convolution (such as 5×5 convolution kernel, for example) may be adopted to model spatial context information. In example implementations, as the entropy parameter network cannot access predictions from the context model beyond the current latent element, a smaller convolution kernel (such as 1×1 convolution kernel, etc.) may be adopted as a basic element of the entropy parameter network.

In example implementations, intermediate features between layers of a LIC model need to be stored. Depending on the type of device, memory available to store the intermediate features between layers of the LIC model may be limited, especially for devices with limited resources such as smartphone or tablet, etc. Furthermore, since the memory size required for storing the intermediate features is directly related to the input image size, each input image may first need to be divided into smaller image blocks before being processed by the LIC model.

In example implementations, different image blocks from an input image may represent different attributes or properties of the image. For example, image blocks from an input image may have different attributes, such as different variances, different types of objects included, different structures (such as texture, context, etc.), and may further belong to different scenes. In example implementations, if the LIC model is trained using randomly cropped image patches, the compression efficiency thereof may be optimized for image blocks having different attributes (or different types of attributes), and may not be optimized for a group of image blocks sharing same or similar attributes. In this case, the LIC model may be sub-optimal to process individual image blocks.

In example implementations, multiple models may be used to encode and decode image blocks. In example implementations, each model may be configured to target at a group of image blocks that share same or similar attributes. In example implementations, an input image block may be fed or inputted to one or more of the multiple models during encoding, and a model that produces the best compression efficiency may be selected as the best candidate for such input image block. In example implementations, an index indicating which model is selected for encoding the input block may be indicated (e.g., flagged or marked) in the bitstream. In example implementations, when a decoder receives the bitstream, the decoder may select a corresponding decoding model based on a flag in the bitstream, and complete a decoding process using the selected model.

In example implementations, one or more selection criteria may be defined, so that image blocks sharing same or similar attributes may be grouped together to form a dataset, thus generating a plurality of content-aware datasets, with each dataset including image blocks whose attributes have a degree of similarity greater than a predetermined threshold, for example.

In example implementations, the selection criteria may be defined based on a number of factors, including but not limited to, a variance of image block, object(s) or scene(s) included in image block, texture associated with image block, etc. For example, a variance of image block may be used as a selection criterion as the variance represents the complexity of the image block. For example, image blocks with different variances may be grouped using any grouping or clustering algorithm such as k-means method, etc., and image blocks with similar variance are grouped into a same group, and form a dataset. In example implementations, it can be defined as object or scene such as animal, sky, car, etc. For example, image blocks can be grouped using any classification algorithm, and image blocks that belong to a same group form a dataset.

In example implementations, after datasets representing different attributes are generated, each individual dataset may be used to train a neural network model. Additionally or alternatively, an individual dataset may be used to finely tune a neural network model from a generic pre-trained model. In example implementations, due to the content-aware nature of the datasets, a model (or called a content-aware model) that is trained or finely tuned based on a particular dataset has a better performance as compared to that of a generic pre-trained model or a model trained or finely tuned using a dataset with dissimilar attributes.

In example implementations, in order for a generic pre-trained model to perform equally well on different type of image blocks, the model normally needs to be very large in size (e.g., in terms of memory for storing model parameters, etc.) to handle different type of image blocks. On the other hand, each model that is trained using image blocks with similar attributes (i.e., target attributes having similar values) can perform well on input image blocks with the target attributes, with significantly small capacity or size as compared to that of a generic pre-trained model.

In example implementations, the capacity of each model may further be reduced using at least one of model sparsification, pruning, unification, quantization or other model compression and acceleration methods, while maintaining its original model structure. In example implementations, the capacity of each model may be reduced by designing a smaller model structure. In example implementations, the capacity of each model may be reduced by designing a smaller model structure and adopting at least one of model sparsification, pruning, unification, quantization or other model compression and acceleration methods.

In example implementations, the quantized latent representation $\hat{y}$ may be modeled as a predetermined type of distribution, such as a Gaussian convolved with a unit uniform distribution. In example implementations, mean and scale parameters may be estimated using an entropy parameter network (such as entropy parameters $N(\mu,\theta)$) which combines a context model (i.e., context model blocks) and hyper inverse transformed results.

In example implementations, if the quantized latent representation $\hat{y}$ is modeled as a Gaussian convolved with a unit uniform distribution an entropy parameters module may include a Gaussian scale mixture model (GSM), in where N Gaussian signals are mixed to represent a latent signal. In example implementations, $\theta$s of these N Gaussian signals may be defined as follows:

def                get_scale_table(min=SCALES_MIN, max=SCALES_MAX, levels=SCALES_LEVELS):
    return torch.exp(torch.linspace(math.log(min), math.log (max), levels))
    $\theta$=get_scale_table( )
    where SCALES_MIN is the min variance cap of Gaussian signals, SCALES_MAX is the max variance cap of Gaussian signals, and SCALES_LEVELS (N) is the number of Gaussian signals in the entropy parameters module. By way of example and not limitation, SCALES_MIN, SCALES_MAX and SCALES_LEVELS may be fixed to 0.11, 256 and 64, for example.

In example implementations, when latent signals are mapped to GSMs in the entropy parameters module, some latent values may be encoded as bypass values if they are bigger than a predetermined threshold (which can be named as tail_mass or likelihood_lower_bound). By way of example and not limitation, this predetermined threshold may be predefined as 1e-9, for example.

In example implementations, smooth range (i.e., low variance) image blocks are common in modern imagery where the image size usually exceeds 4K, 8K or 16K and portion of the scenery are very smooth. However, performance may be reduced for image blocks with very low variance due to the predefined SCALES_MIN cap (such as 0.11 in this example) and the predefined tail_mass/likelihood_lower_bound cap (such as 1e-9 in this example). In this example, the predefined SCALES_MIN cap may be too large for low variance image blocks while the tail_mass/ likelihood_lower_bound cap may be too small for low variance image blocks.

In example implementations, in order to solve the SCALES_LEVELS problem in training with low variance image blocks, the predefined value may be changed, or the SCALES_LEVELS value may be scaled by a new factor (namely, scale_ext). Furthermore, a smaller variance may be assigned to the extended Gaussian signals:

$$\text{scales\_step} =)math.\log(\text{SCALES\_MAX}) - math.\log(\text{SCALES\_MIN}))$$

$$/(\text{SCALES\_LEVEL} - 1)$$

$$\text{scales\_min} = math.\exp(math.\log(\text{SCALES\_MIN}) - \text{scales\_step} * \text{scale\_ext})$$

$$\text{scales\_levels} = \text{SCALES\_LEVELS} + \text{scales\_ext}$$

In example implementations, for the tail_mass/likelihood_ lower_bound problem in training with low variance image blocks, the predefined value may be updated with a larger value.

In example implementations, the above proposed modifications may be not needed if no low variance image blocks dataset is used in the training process.

In example implementations, at the encoding stage, a list of model candidates may be used to encode and decode current input image block(s), and a model that produces the best or highest compression efficiency may be selected by an encoder for encoding the current input image block(s). In example implementations, the encoder may further include an index representing the model selected for the current input image block(s) in a bitstream to be sent. In example implementations, the index representing the selected model may be included in a model selection flag of the bitstream.

In example implementations, the list of model candidates may include models that are available to the encoder and/or the decoder to allow the encoder and/or the decoder to select a corresponding model that produces the best or highest compression efficiency for each input image block or each group of input image blocks. In example implementations, the encoder and the decoder may use the same information to infer the model to be applied, instead of explicitly signaling the model index. For example, the encoder and the decoder may use statistics and characteristics from already coded image blocks to determine the model index to be used to encode/decode the current image block.

In example implementations, the encoder may include a model selection module that is configured to generate a list of most probable model (MPM) candidates. In example implementations, models included in this MPM list may be used to process current input image block(s), and a model that produces the best or highest compression efficiency may be selected as the best candidate. In example implementations, the encoder may include a MPM list index corresponding to the model selected for the current input image block(s) in a bitstream to be sent.

In example implementations, the encoder may include a model selection module that may be designed using either a neural network model or any other selection or decision methods. In example implementations, inputs to the model selection module may include historical or past spatial and/or temporal neighboring image blocks that have been processed by previous iterations, so that the decoder may duplicate the MPM list at the decoding stage.

In example implementations, at the decoding stage, the decoder may first parse the model selection flag to get a model index, and use a decoding model corresponding to the model index to decode current image block(s) or the rest of the bitstream and restore decoded image blocks.

In example implementations, if the MPM method is used at the encoding stage, the decoder may first generate a MPM list using a model selection module, and parse the model selection flag to obtain a model index from the MPM list. The decoder may then use the selected decoding model to decode current image block(s) or the rest of the bitstream and restore decoded image blocks.

The aforementioned implementations can be combined freely according to requirements and/or scenarios. Furthermore, the aforementioned implementations may be applicable to other learning-based image coding standards, such as JPEG AI, etc.

One skilled in the art will appreciate that all of the above aspects of the present disclosure may be implemented concurrently in any combination thereof, and all aspects of the present disclosure may be implemented in combination as yet another embodiment of the present disclosure.

For example, a computing system (such as a system including an encoder, etc.) may receive an input image block, input the input image block into multiple models, and determine a model having the highest compression efficiency from among the multiple models. In example implementations, the multiple models may be trained using a plurality of different datasets of image blocks, each model of the multiple models being trained using a dataset having similar attributes. In example implementations, the attributes may include at least one of a variance of at least one image block, an object included in the at least one image block, a texture associated with the at least one image. In example implementations, the computing system including the encoder may group different image blocks into the plurality of different datasets based at least in part on one or more selection criteria, or group different image blocks into the plurality of different datasets based at least in part on a grouping or clustering algorithm or a classification algorithm. In example implementations, the computing system including the encoder may reduce a capacity of a model of the multiple models. By way of example and not limitation, the computing system including the encoder may reduce the capacity of the model of the multiple models by performing at least one of model sparsification, pruning, unification, quantization, and model compression, for example.

In example implementations, the encoder may further encode the input image block using the determined model, and send the encoded image block in a bitstream to another computing system (such as a system including a decoder, for example). In example implementations, when sending the encoded image block in a bitstream to another computing system, the computing system including the encoder may add a model selection flag representing the determined model for the input image block in the bitstream.

For another example, a computing system (such as a computing system including a decoder, for example) may receive a video bitstream, and select a decoding model from among a plurality of predefined decoding models used for decoding a video image block from the video bitstream. In example implementations, the computing system may decode the video image block using the decoding model.

In example implementations, the computing system may parse a model selection flag from the video bitstream to obtain a model index. In example implementations, the computing system may parse the model selection flag to obtain the model index from a MPM list, the MPM list comprising a list of candidate models for encoding and decoding image blocks. In this case, the computing system may select the decoding model used for decoding the video image block from among the plurality of predefined decoding models by selecting the decoding model based at least in part on the model index.

Additionally or alternatively, the computing system may determine a model index based at least in part on statistics and characteristics obtained from already decoded image blocks. In this case, the computing system may select the decoding model used for decoding the video image block from among the plurality of predefined decoding models by selecting the decoding model based at least in part on the model index.

Figure 4:
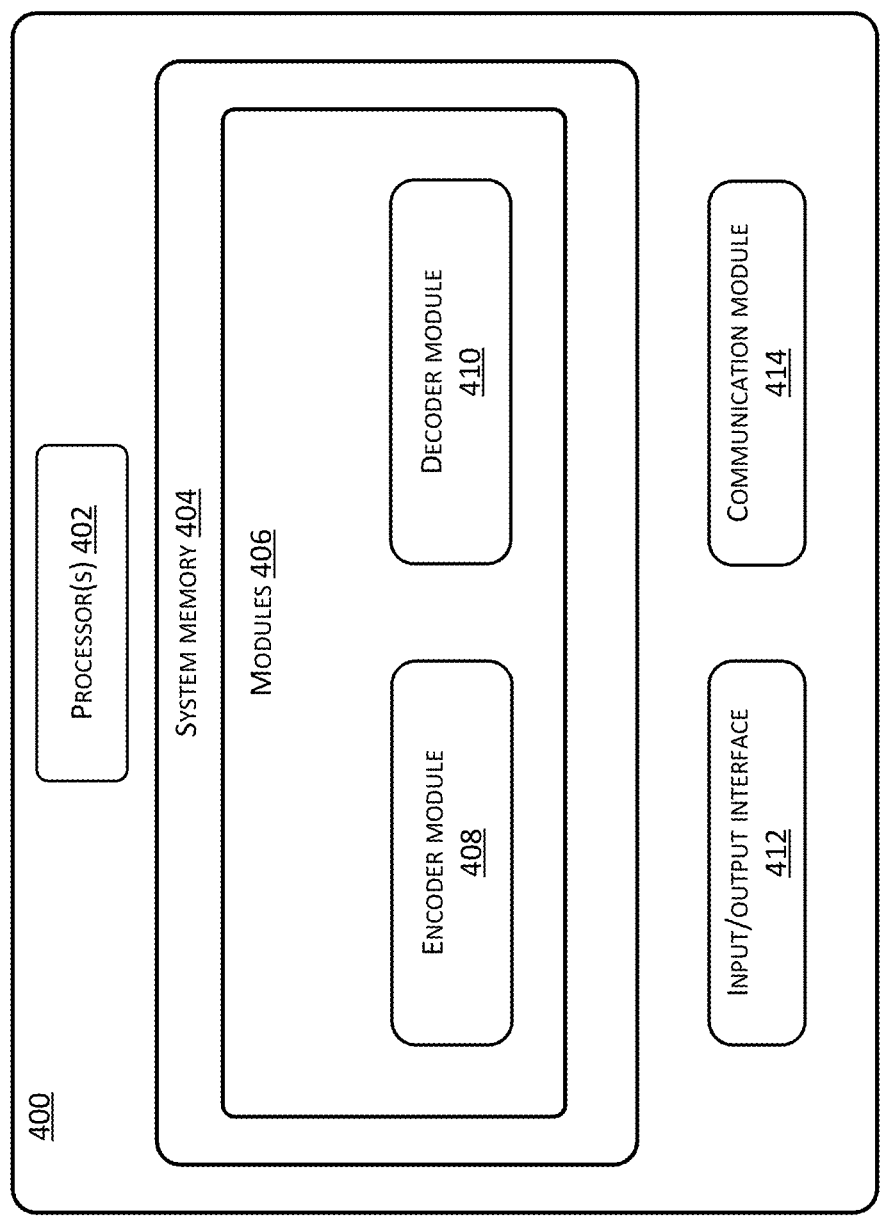
FIG. 4 illustrates an example system for implementing the above-described processes and methods.

FIG. 4 illustrates an example system 400 for implementing the processes and methods described above.

The techniques and mechanisms described herein may be implemented by multiple instances of the system 400 as well as by any other computing device, system, and/or environment. The system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 400 may include one or more processors 402 and system memory 404 communicatively coupled to the processor(s) 402. The processor(s) 402 may execute one or more modules and/or processes to cause the processor(s) 402 to perform a variety of functions. In some embodiments, the processor(s) 402 may include a central processing unit ("CPU"), a graphics processing unit ("GPU"), both CPU and GPU, or other processing units or components known in the art. Additionally, each of the processor(s) 402 may possess its own local memory, which also may store program modules, program data, and/or one or more operating systems.

Depending on the exact configuration and type of the system 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, an encoder module 408 and a decoder module 410.

The encoder module 408 may be configured to perform encoding upon frames from a video source, and to signal flags in a bitstream by any of the methods described above.

The decoder module 410 may be configured to perform decoding upon frames from a video source by any of the methods described above.

The system 400 may additionally include an input/output (I/O) interface 412 for receiving video source data and bitstream data, and for outputting decoded frames into a reference frame buffer and/or a display buffer. The system 400 may also include a communication module 414 allowing the system 400 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The present disclosure can be further understood using the following clauses.

Clause 1: A method implemented by a computing device, the method comprising: receiving an input image block; inputting the input image block into multiple models, wherein the multiple models are trained using a plurality of different datasets of image blocks, each model of the multiple models being trained using a dataset having similar attributes; and determining a model having a highest compression efficiency from among the multiple models.

Clause 2: The method of Clause 1, wherein the attributes comprise at least one of a variance of at least one image block, an object included in the at least one image block, a texture associated with the at least one image block.

Clause 3: The method of Clause 1, further comprising: encoding the input image block using the determined model; and sending the encoded image block in a bitstream.

Clause 4: The method of Clause 3, further comprising: adding a model selection flag representing the determined model for the input image block in the bitstream.

Clause 5: The method of Clause 1, further comprising grouping different image blocks into the plurality of different datasets based at least in part on one or more selection criteria.

Clause 6: The method of Clause 1, further comprising grouping different image blocks into the plurality of different datasets based at least in part on a grouping or clustering algorithm or a classification algorithm.

Clause 7: The method of Clause 1, further comprising reducing a capacity of a model of the multiple models.

Clause 8: The method of Clause 7, wherein reducing the capacity of the model of the multiple models comprises performing at least one of model sparsification, pruning, unification, quantization, and model compression.

Clause 9: One or more computer readable media storing executable instructions that, when executed by one or more processors, cause the one or more processors to perform acts comprising: receiving an input image block; inputting the input image block into multiple models, wherein the multiple models are trained using different datasets of image blocks, each model of the multiple models being trained using a dataset having similar attributes; and determining a model having a highest compression efficiency from among the multiple models.

Clause 10: The one or more computer readable media of Clause 9, wherein the attributes comprise at least one of a variance of at least one image block, an object included in the at least one image block, a texture associated with the at least one image block.

Clause 11: The one or more computer readable media of Clause 9, the acts further comprising: encoding the input image block using the determined model; and sending the encoded image block in a bitstream.

Clause 12: The one or more computer readable media of Clause 11, the acts further comprising: adding a model selection flag representing the determined model for the input image block in the bitstream.

Clause 13: The one or more computer readable media of Clause 9, the acts further comprising grouping different image blocks into the plurality of different datasets based at least in part on one or more selection criteria.

Clause 14: The one or more computer readable media of Clause 9, the acts further comprising grouping different image blocks into the plurality of different datasets based at least in part on a grouping or clustering algorithm or a classification algorithm.

Clause 15: The one or more computer readable media of Clause 9, the acts further comprising reducing a capacity of a model of the multiple models.

Clause 16: The one or more computer readable media of Clause 15, wherein reducing the capacity of the model of the multiple models comprises performing at least one of model sparsification, pruning, unification, quantization, and model compression.

Clause 17: A system comprising: one or more processors; and memory storing executable instructions that, when executed by the one or more processors, cause the one or more processors to perform acts comprising: receiving a video bitstream; selecting a decoding model from among a plurality of predefined decoding models used for decoding a video image block from the video bitstream; and decoding the video image block using the decoding model.

Clause 18: The system of Clause 17, further comprising parsing a model selection flag from the video bitstream to obtain a model index, wherein selecting the decoding model used for decoding the video image block from among the plurality of predefined decoding models comprises selecting the decoding model based at least in part on the model index.

Clause 19: The system of Clause 18, wherein parsing the model selection flag from the video bitstream to obtain the model index comprises parsing the model selection flag to obtain the model index from a MPM list, the MPM list comprising a list of candidate models for encoding and decoding image blocks.

Clause 20: The system of Clause 18, further comprising determining a model index based at least in part on statistics and characteristics obtained from already decoded image blocks, wherein selecting the decoding model used for decoding the video image block from among the plurality of predefined decoding models comprises selecting the decoding model based at least in part on the model index.

What is claimed is:

1. A method implemented by a computing device, the method comprising:

receiving an input image block;

inputting the input image block into multiple models, wherein the multiple models are trained using a plurality of different datasets of image blocks, a model of the multiple models being trained using a dataset including multiple image blocks with a similar variance; and after inputting the input image block into the multiple models, determining a model having a highest compression efficiency from among the multiple models, wherein at least another model of the multiple models is trained using a dataset including a plurality of image blocks having similar attributes, and the similar attributes comprise at least one of an object included in the plurality of image blocks, or a texture associated with the plurality of image blocks.

2. The method of claim 1, further comprising:

encoding the input image block using the determined model; and sending the encoded image block in a bitstream.

3. The method of claim 2, further comprising: adding a model selection flag representing the determined model for the input image block in the bitstream.

4. The method of claim 1, further comprising grouping different image blocks into a plurality of different datasets based at least in part on one or more selection criteria.

5. The method of claim 1, further comprising grouping different image blocks into a plurality of different datasets based at least in part on a grouping or clustering algorithm or a classification algorithm.

6. The method of claim 1, further comprising reducing a capacity of the determined model.

7. The method of claim 6, wherein reducing the capacity of the determined model comprises performing at least one of model sparsification, pruning, unification, quantization, or model compression.

8. One or more computer readable media storing executable instructions that, when executed by one or more processors, cause the one or more processors to perform acts comprising:

receiving an input image block;

inputting the input image block into multiple models, wherein the multiple models are trained using different datasets of image blocks, a model of the multiple models being trained using a dataset including multiple image blocks with a similar variance; and after inputting the input image block into the multiple models, determining a model having a highest compression efficiency from among the multiple models, wherein at least another model of the multiple models is trained using a dataset including a plurality of image blocks having similar attributes, and the similar attributes comprise at least one of an object included in the plurality of image blocks, or a texture associated with the plurality of image blocks.

9. The one or more computer readable media of claim 8, the acts further comprising:

encoding the input image block using the determined model; and sending the encoded image block in a bitstream.

10. The one or more computer readable media of claim 9, the acts further comprising: adding a model selection flag representing the determined model for the input image block in the bitstream.

11. The one or more computer readable media of claim 8, the acts further comprising grouping different image blocks into a plurality of different datasets based at least in part on one or more selection criteria.

12. The one or more computer readable media of claim 8, the acts further comprising grouping different image blocks into a plurality of different datasets based at least in part on a grouping or clustering algorithm or a classification algorithm.

13. The one or more computer readable media of claim 8, the acts further comprising reducing a capacity of the determined model.

14. The one or more computer readable media of claim 13, wherein reducing the capacity of the determined model comprises performing at least one of model sparsification, pruning, unification, quantization, and model compression.

* * * * *